Patented Mar. 27, 1934

1,952,941

UNITED STATES PATENT OFFICE 1,952,941

ARTIFICIAL MASS AND PROCESS FOR ITS MANUFACTURE

Kurt Ripper, Berlin, Germany

No Drawing. Original application September 19, 1928, Serial No. 307,054. Divided and this application May 26, 1930, Serial No. 455,950. In Austria September 21, 1927

12 Claims. (Cl. 260—3)

This invention relates to artificial masses which comprise a reaction product resulting from acting with formaldehyde on a proteid body, especially casein, in the presence of dicyandiamide.

The present application is a division of my copending application Serial No. 307,054, filed September 19, 1928.

According to this invention hitherto unknown condensation products are produced by reacting with formaldehyde upon dicyandiamide together with a protein, especially casein, which are easily formed and can be utilized for manifold technical and industrial purposes. Especially they are adapted for making molding powders or compositions which by pressing yield an article transparent or light colored up to a pure white which is perfectly stable to light and of high industrial value. On the other hand shaped artificial masses such as slabs, blocks or rods and the like may be made from the said mixed colloids.

The method of manufacturing such mixed colloids essentially consists in reacting with formaldehyde under heat upon dicyandiamide whilst simultaneously or subsequently effecting the condensation of formaldehyde with a protein, especially casein, with or without the use of a catalyst or contacting agent. The casein may be added to the starting mixture simultaneously with the other ingredients or it may be introduced into the reaction mixture during the condensation of the amide component with the formaldehyde or else it may be added to a resinous or powdery dicyandiamide-formaldehyde condensation product. An indispensable condition is that the casein can still react with the formaldehyde to give a mixed colloid.

By drying and grinding the condensation products are transformed into a white powder, which under the combined or separate action of heat and pressure can be molded into articles of various kind which are transparent or light colored up to a pure white and stable to light. The molded articles are suitable for the use as substitutes for milk glass, porcelain and the like, for fancy goods, trinketry and like articles, and also as electric insulating material, the many and most various possibilities of utilization being not exhausted by the foregoing enumeration.

The capacity of dicyandiamide, of decreasing the viscosity of proteins and of forming the corresponding mixed colloids can also be utilized for manufacturing molded artificial masses such as slabs, blocks or rods.

The hitherto known manufacture of artificial masses made from albuminous substances, particularly from casein, is effected by forming from the respective protein a paste, which first of all is shaped into slabs or bars, then is subjected to the action of formaldehyde and finally dried. The artificial masses thus obtained have many disadvantageous properties, the most obnoxious of which are the difficulty of producing pieces of relatively greater thickness, the sensitiveness to water, little resistance to heat and low electric strength. Now the manufacture of slabs and bars or the like in the hitherto usual manner can be considerably improved, by incorporating with dicyandiamide a highly concentrated paste formed from the respective protein by thoroughly commingling it with water. The mass is then shaped into plates or rods, subjected to the action of formaldehyde and dried. As an alternative, the proteid body (especially casein), dicyandiamide and a dry compound capable of giving off formaldehyde (such as for instance trioxymethylene) are intimately mixed and molded by pressure with or without the application of heat and with or without the use of a catalyst. Thereafter the mass is advantageously subjected to a drying process.

When the mixture is pressed, without applying heat the above method yields also artificial masses of valuable properties; but if operations are carried out in the cold no mixed colloid is produced. In this method of working, the addition of the amide component during the formation of the paste is only made for the purpose of obtaining a considerably higher concentration of protein, for instance casein, in a paste of equal viscosity.

I claim:

1. The process of manufacturing an artificial mass which comprises condensing with formaldehyde under heat dicyandiamide and a proteid body.

2. The process of manufacturing an artificial mass which comprises condensing with formaldehyde under heat dicyandiamide and a proteid body, and converting the condensation product so obtained into a non-thermoplastic state by the action of heat.

3. The process of manufacturing an artificial mass which comprises condensing with formaldehyde under heat dicyandiamide and a proteid body, and converting the condensation product so obtained into a non-thermoplastic state by heat and pressure.

4. A process of manufacturing an artificial mass which comprises liquefying a proteid body, in the presence of water, by addition of dicyandiamide, and reacting formaldehyde under heat on the solution so obtained to form a thermoplastic mixed condensation product adapted to be converted, by the action of heat, into a non-thermoplastic state.

5. A process which comprises impasting casein by stirring it with water, adding thereto dicyandiamide, in such proportions as to convert the paste into a liquid, adding formaldehyde to the liquid so obtained in such an amount as to form condensation products with both the casein and the dicyandiamide present, and heating the mixture until a mixed condensation product has been formed having the property of being molded under heat and going over into a non-thermoplastic state thereby.

6. The process of making a molding composition which comprises condensing formaldehyde under heat with dicyandiamide and a proteid body, allowing the reaction to proceed until a mixed condensation product has been formed, separating the so-produced condensation product from the liquid, and drying.

7. A molded article obtained by treatment under heat and pressure of a molding powder comprising a mixed condensation product resulting from the reacting under heat of formaldehyde upon dicyandiamide and a proteid body.

8. A condensation product resulting from acting with formaldehyde on a proteid body and dicyandiamide.

9. A condensation product resulting from acting with formaldehyde on casein and dicyandiamide.

10. A mixed condensation product resulting from the reacting under heat with formaldehyd' on a proteid body and dicyandiamide.

11. A mixed condensation product resulting from the reacting under heat with formaldehyde on dicyandiamide and casein.

12. The process of manufacturing a molding powder which comprises reacting under heat with formaldehyde upon dicyandiamide, introducing during the condensation process a proteid body, continuing the condensation process and drying the resultant product.

KURT RIPPER.